(12) United States Patent
Costa et al.

(10) Patent No.: US 12,527,229 B2
(45) Date of Patent: Jan. 13, 2026

(54) THERMALLY STABLE SPIN ORBIT TORQUE LAYER FOR AN MRAM DEVICE

(71) Applicant: IMEC VZW, Leuven (BE)

(72) Inventors: Jose Diogo Costa, Heverlee (BE); Sebastien Couet, Grez-Doiceau (BE); Geoffrey Pourtois, Villers-la-Ville (BE); Benoit Van Troeye, Nivelles (BE)

(73) Assignee: IMEC VZW, Leuven (BE)

( * ) Notice: Subject to any disclaimer, the term of this patent is extended or adjusted under 35 U.S.C. 154(b) by 442 days.

(21) Appl. No.: 18/058,010

(22) Filed: Nov. 22, 2022

(65) Prior Publication Data

US 2023/0165159 A1    May 25, 2023

(30) Foreign Application Priority Data

Nov. 25, 2021 (EP) .................................. 21210384

(51) Int. Cl.
*H10N 50/10* (2023.01)
*G11C 11/16* (2006.01)
*H10N 50/80* (2023.01)

(52) U.S. Cl.
CPC ........... *H10N 50/10* (2023.02); *G11C 11/161* (2013.01); *H10N 50/80* (2023.02)

(58) Field of Classification Search
CPC ...... G11C 11/161; H10N 50/10; H10N 50/80; H10N 50/01
See application file for complete search history.

(56) References Cited

U.S. PATENT DOCUMENTS

| | | | |
|---|---|---|---|
| 11,177,433 B2 | 11/2021 | Lin et al. | |
| 2018/0175285 A1 | 6/2018 | Yoshimi et al. | |
| 2019/0305212 A1 | 10/2019 | Gosavi et al. | |
| 2020/0006424 A1* | 1/2020 | Sato | H10B 61/22 |
| 2020/0006625 A1 | 1/2020 | Oguz et al. | |
| 2020/0083286 A1* | 3/2020 | Manipatruni | H10D 84/834 |
| 2020/0212104 A1 | 7/2020 | Sonobe | |
| 2020/0227626 A1 | 7/2020 | Lee et al. | |
| 2021/0098694 A1 | 4/2021 | Gupta et al. | |

(Continued)

FOREIGN PATENT DOCUMENTS

| | | |
|---|---|---|
| CN | 110923647 B | 9/2021 |
| EP | 3671874 A1 | 6/2020 |
| JP | 2021-057357 A | 4/2021 |

OTHER PUBLICATIONS

Extended European Search Report and Written Opinion, Application No. EP 21210384.0, mailed Jun. 13, 2022, 7 pages.

(Continued)

*Primary Examiner* — Wasiul Haider
(74) *Attorney, Agent, or Firm* — McDonnell Boehnen Hulbert & Berghoff LLP

(57) ABSTRACT

The disclosure relates to spin orbit torque (SOT) magnetic random access (MRAM) devices. A magnetic structure for a SOT-MRAM device and a method for fabricating the magnetic structure are presented. The magnetic structure comprises a SOT layer and a magnetic tunnel junction (MTJ) structure arranged on the SOT layer. The SOT layer comprises a material combination of a bismuth-based material and a metal having a melting point of at least 1000° C. As a result, the SOT is thermally stable and also shows a large spin Hall angle (SHA).

16 Claims, 9 Drawing Sheets

(56) References Cited

U.S. PATENT DOCUMENTS

2021/0359199 A1* 11/2021 Lin .................. H10N 52/01
2023/0063084 A1* 3/2023 Pham ................ H10N 50/85

OTHER PUBLICATIONS

Khang, Nguyen Huynh Duy, Soichiro Nakano, Takanori Shirokura, Yasuyoshi Miyamoto, and Pham Nam Hai. "Ultralow power spin-orbit torque magnetization switching induced by a non-epitaxial topological insulator on Si substrates." Scientific reports 10, No. 1 (2020): 1-12.

* cited by examiner

THERMALLY STABLE SPIN ORBIT TORQUE LAYER FOR AN MRAM DEVICE

CROSS-REFERENCE TO RELATED APPLICATIONS

The present application is a non-provisional patent application claiming priority to European Patent Application No. EP 21210384.0, filed Nov. 25, 2021, the contents of which are hereby incorporated by reference.

FIELD OF THE DISCLOSURE

This disclosure relates to spin orbit torque (SOT) magnetic random access memory (MRAM) devices (i.e., SOT-MRAM devices). In particular, a magnetic structure for such a SOT-MRAM device and a method for fabricating the magnetic structure are disclosed. The magnetic structure of this disclosure comprises a thermally stable SOT layer.

BACKGROUND

Next generation MRAM devices exploit the SOT phenomenon by using an SOT layer for switching a magnetic free layer of a magnetic tunnel junction (MTJ) structure arranged on the SOT layer. The typical figure of merit of such an SOT layer is its spin Hall angle (SHA), which quantifies how effective the SOT material of the SOT layer transfers a spin current into the magnetic free layer. A large SHA is desired for a successful SOT-MRAM technology, as it lowers the switching current.

Conventional SOT materials include heavy metals, for example, tantalum (Ta), beta-tungsten (beta-W), and platinum (Pt). These SOT materials possess a high spin-orbit-coupling (SOC), which is a prerequisite for a high SHA.

SUMMARY

This disclosure relates to characteristics that may be important for a SOT layer including a sufficiently large SHA and other relevant characteristics. For example, any MRAM device for an embedded memory application should be able to withstand a 400° C. annealing sequence, since such an annealing sequence is usually applied somewhere in the integration flow after patterning steps have occurred. In particular, the standard complementary metal-oxide-semiconductor (CMOS) back-end-of-line (BEOL) integration flow includes one or more 400° C. annealing sequences for fabricating copper (Cu) interconnects.

FIG. 1 illustrates a magnetic structure (also called a stack) of one example of a SOT-MRAM device 10. The SOT-MRAM device 10 comprises a SOT layer (also referred to as a SOT track), a spacer layer arranged on the SOT layer, a magnetic free layer arranged on the spacer layer, an MgO tunnel barrier arranged on the magnetic free layer, and a magnetic pinned layer arranged on the tunnel barrier. The spin current is generated in the SOT layer, and generates a torque that switches the magnetic state of the magnetic free layer, thus enabling the writing of a bit state into the magnetic free layer. Materials with a large SHA used as part of the SOT layer are beneficial for efficiently switching the magnetic state of the magnetic free layer. The selection of an adequate SOT layer material poses technical challenges.

For example, topological insulator materials have demonstrated a very large SHA, which would be expected to translate into a very efficient SOT switching. Topological insulator materials include, for example, sputtered bismuth antimonide (BiSb), which has a particularly large SHA. However, the melting temperature of BiSb is below 400° C., which makes this SOT layer material not complementary metal-oxide semiconductor (CMOS) back-end of line (BEOL) compatible.

Other possible topological insulator materials, such as bismuth selenide ($Bi_2Se_3$), have a higher melting temperature, but reveal a strong material diffusion after a 300° C. annealing sequence. FIG. 2 illustrates in this respect that Bi rich and Se rich regions develop, respectively, after performing the annealing sequence. This strong material diffusion seems to also affect the adhesion of the $Bi_2Se_3$ layer.

In view of the above, an example embodiment describes a SOT layer (material), which is thermally and physically stable. In particular, the SOT layer of should withstand temperatures of at least 400° C., as occurring in typical annealing sequences during CMOS BEOL processing. Another example embodiment discloses that the SOT layer reflects an SHA sufficient for use in an SOT-MRAM device to efficiently switch a magnetization of a magnetic free layer.

This functionality is achieved by the embodiments provided in the enclosed independent claims. Additional examples and embodiments are provided in the dependent claims.

An example embodiment describes a magnetic structure for a SOT-MRAM device, the magnetic structure comprising: a SOT layer; and a MTJ structure arranged on the SOT layer; wherein the SOT layer comprises a material combination of a bismuth-based material and a metal having a melting point of at least 1000° C.

The SOT layer comprising the material combination has a high thermal and physical stability. In particular, the SOT layer has a high melting point (well above 400° C.), and is thus CMOS BEOL compatible. Further, the SOT layer has a sufficiently large SHA, in order to achieve an efficient magnetization switching in a magnetic free layer of the MTJ structure.

The magnetic structure may be configured such that when a current is passed along the SOT layer, a SOT is generated and causes the magnetization of the magnetic free layer in the MTJ structure to switch (from one state to the opposite state). The magnetic free layer may, for instance, be arranged adjacent to the SOT layer or close to the SOT layer. The switching of the magnetization in the magnetic free layer is caused by a transfer of orbital angular momentum from electrons or holes of the SOT layer to the magnetic free layer.

In this way, a bit state can be written into the magnetic free layer. The bit state in the magnetic free layer may also be read, for instance, by using the tunnel magnetoresistance (TMR) effect and measuring the TMR through the MTJ structure. That is, depending on the magnetization of the magnetic free layer (e.g., compared to a magnetization of a magnetic pinned layer or reference layer of the MTJ structure), the measured TMR may be smaller or larger and thus indicates the bit state in the magnetic free layer.

An example embodiment of the magnetic structure includes a material combination that comprises a metallic alloy of bismuth-based material.

An example embodiment of the material combination of the SOT layer describes that the metallic alloy can be fabricated, for example, by sputtering or by co-sputtering the respective materials of the material combination. The metallic alloy can be produced in a simple and accurate manner.

An example embodiment of the magnetic structure describes a concentration of the metal in the metallic alloy is in a range of 5-50%.

These concentrations are sufficient to significantly increase the melting temperature of the SOT layer compared to, for example, utilizing a different concentration such as a SOT layer that comprises only a bismuth-based material.

An example embodiment of the magnetic structure describes that the material combination comprises a multilayer structure of one or more layers of the bismuth-based material and one or more layers of the metal.

An example embodiment of the multilayer structure describes that the material combination of the SOT layer can, for example, be fabricated by depositing one or more layers of the respective materials of the material combination. In particular, the different materials can be deposited alternatingly. The multilayer structure can be produced in a particularly accurate manner as layer thicknesses can be precisely controlled. After the layers are deposited, a subsequent annealing step may be applied to the multilayer structure, which may be beneficial for increasing the melting point of the produced SOT layer.

An example embodiment of the magnetic structure describes that each layer of the multilayer structure has a thickness in a range of 0.2-2 nm.

An example embodiment of the magnetic structure describes that each layer of the metal has a thickness in a range of 0.1-0.7 nm and each layer of the bismuth-based material has a thickness in a range of 1.3-1.9 nm.

An example embodiment the magnetic structure describes that the SOT layer has a thickness in a range of 2-20 nm.

A SOT layer with the above dimensions can provide a SOT that efficiently switches the magnetization of the magnetic free layer in the MTJ structure.

An example embodiment of the magnetic structure describes that the metal has a melting point of at least 1200° C., or of at least 1400° C., or of at least 1600° C.

The higher the melting point of the metal is, the higher the thermal stability of the final SOT layer including the material combination may be.

An example embodiment of the magnetic structure describes that the bismuth-based material comprises at least one of bismuth and bismuth antimonide.

These materials show a high SOC and thus lead to a significantly large SHA of the SOT layer.

An example embodiment of the magnetic structure describes that a concentration of bismuth in the bismuth antimonide is in a range of 70%-90%.

An example embodiment of the magnetic structure describes that the metal comprises at least one of nickel, platinum, and zirconium.

These metals have a high melting point, well above 1000° C., and thus lead to a high thermal stability of the SOT layer.

An example embodiment of the magnetic structure describes that the MTJ structure comprises: a magnetic free layer arranged on the SOT layer or arranged on a spacer layer that is arranged on the SOT layer; a tunnel barrier layer arranged on the magnetic free layer; and a magnetic reference layer or pinned layer arranged on the tunnel barrier layer.

The MTJ structure may further comprise at least one electrode, which may be provided on the magnetic reference layer or on the magnetic hard layer. The SOT layer may be used to switch the magnetization in the magnetic free layer of the MTJ structure to write a bit state. Depending on whether the magnetization in the magnetic free layer is parallel or anti-parallel to the magnetization in the reference layer or the pinned layer, a different TMR through the MTJ structure may be measured. This may be used to read the bit state in the magnetic free layer.

The magnetic structure may also be designed for a voltage controlled magnetic anisotropy (VCMA) gated SOT-MRAM device. In this case, the MTJ structure may be provided with a voltage gate. The magnetic structure may be configured such in this case that, when the current flows in the SOT layer, a magnetization of the magnetic free layer of the MTJ structure switches, if a first gate voltage is applied to the voltage gate, and does not switch, if a second gate voltage is applied to the voltage gate.

The magnetic free layer of the MTJ structure may comprise at least one of an iron layer and a cobalt-based layer, for example, a cobalt layer, a cobalt-iron-boron layer, a cobalt-platinum layer, a cobalt-nickel layer, and/or a cobalt-palladium layer. The examples discussed and described in this disclosure are intended to illustrate concepts but are not limited to the material and/or the type of the magnetic free layer. Generally, for example, a perpendicular magnetized magnetic material may be used for the magnetic free layer.

Another example embodiment described in this disclosure provides a method for manufacturing a magnetic structure for a SOT-MRAM device, the method comprising: fabricating a SOT layer; and fabricating a magnetic tunnel junction, MTJ, structure on the SOT layer; wherein the SOT layer comprises a material combination of a bismuth-based material and a metal having a melting point of at least 1000° C.

An example embodiment describes that the SOT layer is fabricated by co-sputtering the bismuth-based material and the metal using two targets or by sputtering the bismuth-based material and the metal using a single target.

This implementation is particularly useful for fabricating a SOT layer, which comprises an alloy as the material combination.

An example embodiment describes that the SOT layer is fabricated by depositing one or more layers of the bismuth-based material and one or more layers of the metal above each other, for example, depositing alternatingly one layer of the bismuth-based material and one layer of the metal.

This implementation is particularly useful for fabricating a SOT layer, which comprises a multilayer structure as the material combination.

BRIEF DESCRIPTION OF THE DRAWINGS

The above, as well as additional features will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description are described thereinafter according to example embodiments, being not used to limit the claimed scope. There are many different possibilities and the disclosure should not be construed as limited to the embodiments set forth herein; rather, these embodiments are provided for thoroughness and completeness, and fully convey the scope of the disclosure.

As described above, a material that shows a large SHA, physical and thermal stability, and a high melting temperature may be utilized in further developing SOT-MRAM technology. To this end, this disclosure proposes the use of a material combination for fabricating a SOT layer that may be used in a SOT-MRAM device. The material combination of the SOT layer comprises a first material with a large SOC—particularly a bismuth-based material, for example, bismuth—and a second material that provides a higher thermal and physical stability to the SOT layer.

Figure 3:
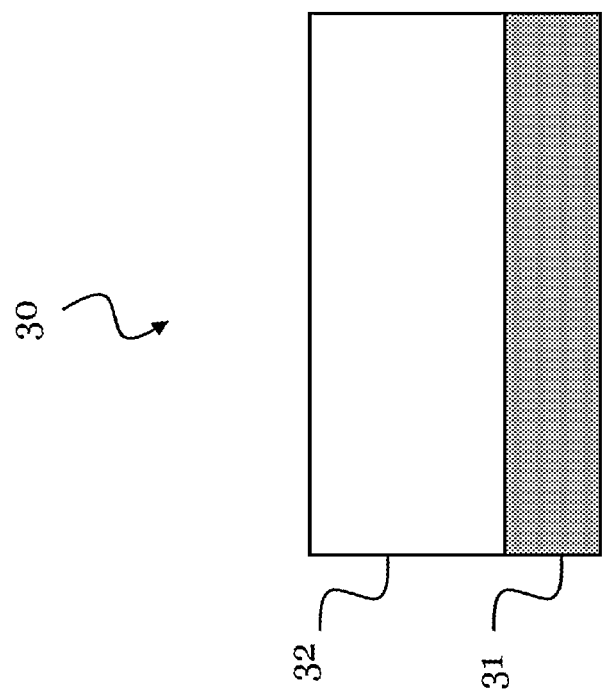
FIG. 3 illustrates a magnetic structure for an SOT-MRAM device, according to an example embodiment.

FIG. 3 illustrates a magnetic structure 30 according to an embodiment of this disclosure. The magnetic structure 30 is suitable for use in an SOT-MRAM device. Accordingly, another embodiment of this disclosure provides an SOT-MRAM device, which comprises the magnetic structure 30 shown FIG. 1.

The magnetic structure 30 comprises an SOT layer 31 and an MTJ structure 32, which is arranged on the SOT layer 31. "Arranged on" means "provided directly on" in this disclosure. "Arranged above" means "provided indirectly on" in this disclosure.

The SOT layer 31 is configured to generate a SOT, which can switch a magnetization in a magnetic free layer of the MTJ structure 30. The SOT layer 31 comprises the material combination, which is a combination of a bismuth-based material (first material) and a metal (second material), wherein the metal has a melting point of at least 1000° C. (at standard conditions). The metal may even have a melting point of at least 1200° C., or of at least 1400° C., or of at least 1600° C. The SOT layer 31 may in total have a thickness in a range of 2-20 nm.

The metal of the material combination of the SOT layer 31—i.e. the metal with the melting point of 1000° C. or more—may comprise at least one of nickel (with a melting point of 1455° C.), platinum (with a melting point of 1768° C.), and zirconium (with a melting point of 1855° C.). The bismuth-based material comprises at least one of bismuth and bismuth antimonide (wherein a concentration of bismuth in the bismuth antimonide is, for example, in a range of 70%-90%, wherein these percentage values of the bismuth concentration are atomic percentages (at %)). Any combination of these material is possible for producing the SOT layer 31. That is, the material combination may combine bismuth with nickel, bismuth with platinum, bismuth with zirconium, bismuth antimonide with nickel, bismuth antimonide with platinum, or bismuth antimonide with zirconium. Moreover, also material combinations of more than two of the before-mentioned materials are possible. For example, the material combination may combine bismuth with nickel and platinum, or bismuth with nickel and zirconium, or nickel with platinum and zirconium. Or, likewise, with bismuth antimonide as the bismuth-based material. Also a material combination combining bismuth and/or bismuth antimonide with nickel, and with platinum, and with zirconium is possible.

Figure 4:
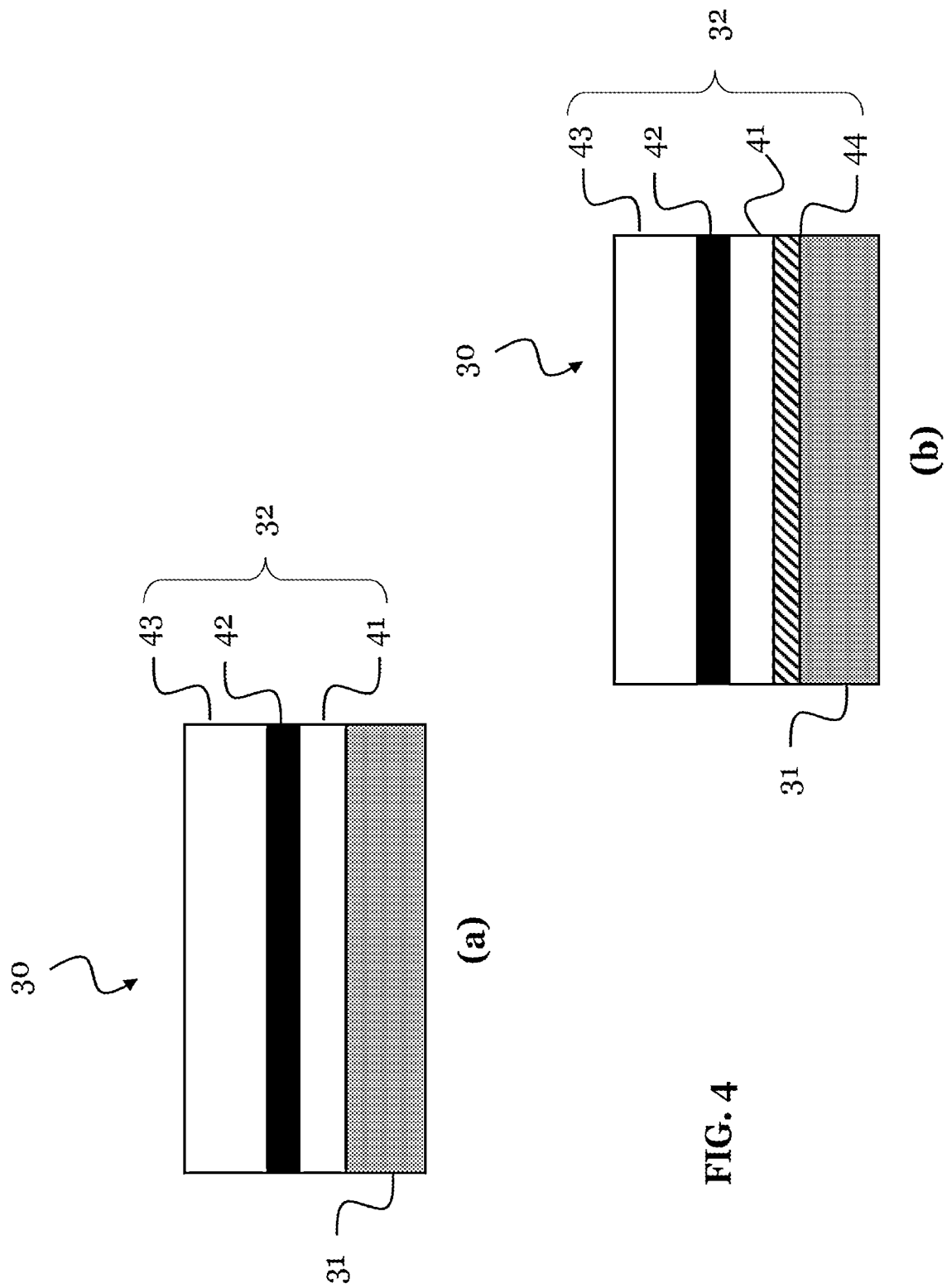
FIG. 4 illustrates another magnetic structure for an SOT-MRAM device, according to an example embodiment.

FIG. 4 illustrates an embodiment of the magnetic structure 30, which builds on the embodiment shown in FIG. 3. Same elements of the magnetic structure 30 shown in FIG. 3 and in FIG. 4 are labelled with the same reference signs and are implemented likewise.

In particular, FIG. 4 illustrates that the MTJ structure 32 of the magnetic structure 30 may comprise a magnetic free layer 41 (e.g., a Co layer, a Co-based layer, or a CoFeB layer), which may be arranged on—i.e. directly on—the SOT layer 31 (see FIG. 4(a)), or may be arranged on a spacer layer 44 that is arranged (directly) on the SOT layer 31 (see FIG. 4(b))— i.e. may be arranged indirectly on the SOT layer 31. Further, the MTJ structure 32 may comprise a tunnel barrier layer 42 (e.g., a magnesium oxide layer) arranged on the magnetic free layer 43, and may comprise a magnetic reference layer (e.g., a Co layer, a Co-based layer, or a CoFeB layer) or a pinned layer arranged on the tunnel barrier layer 42.

Figure 1:
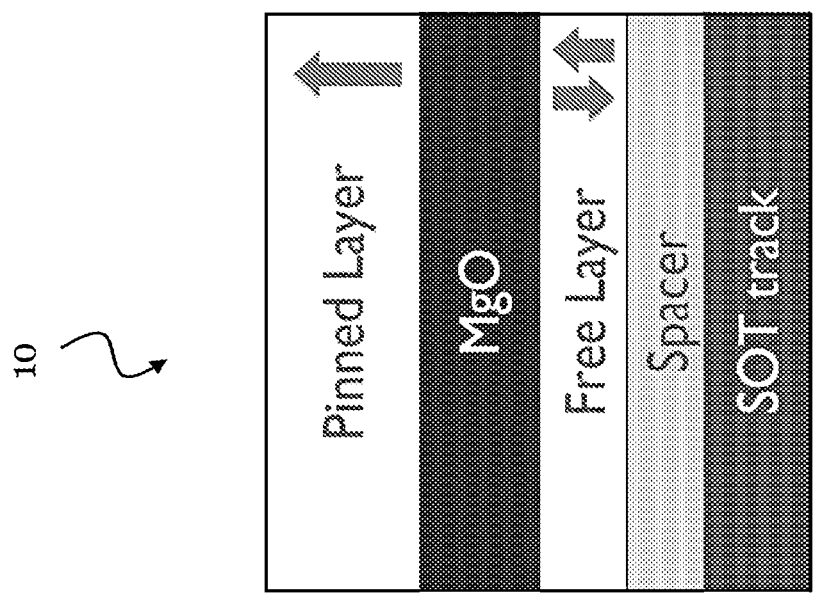
FIG. 1 illustrates a magnetic structure of a SOT-MRAM device according to an example embodiment.
Figure 2:
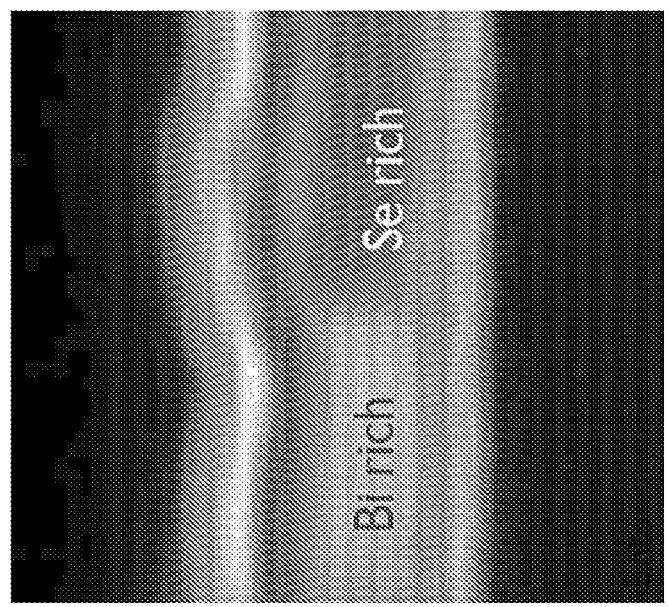
FIG. 2 illustrates results of a scanning tunnel electron microscope (STEM) inspection of a $Bi_2Se_3$ layer after a 300° C. anneal sequence.
Figure 5:
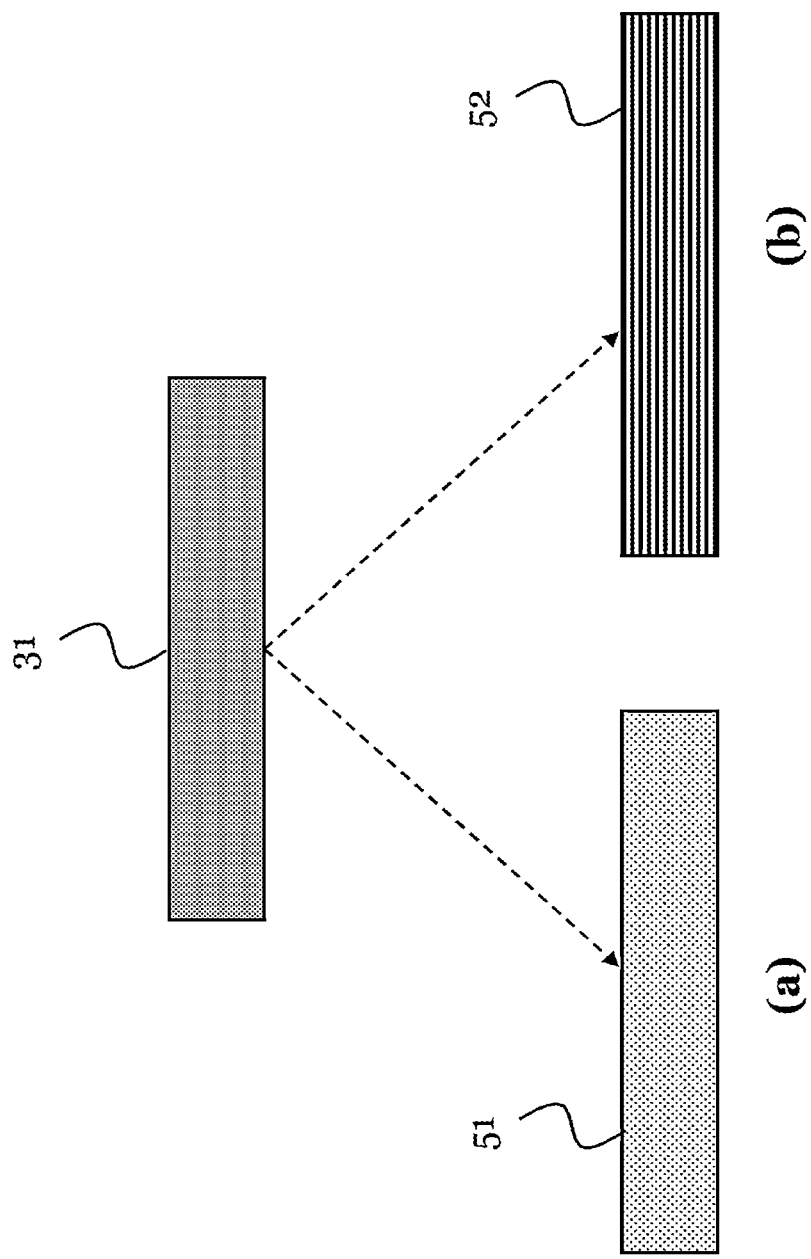
FIG. 5 illustrates two possible implementations for the SOT layer of the magnetic structure according to an example embodiment.

The magnetic structure 30 may also be designed as shown in FIG. 1 for the SOT-MRAM device, wherein the conventional SOT track of FIG. 1 is replaced by the SOT layer 31 of this disclosure, for example, as shown in FIG. 5.

In particular, FIG. 5 illustrates two possible implementations for the SOT layer 31, which comprises the proposed material combination. The two implementations can be combined with each other, i.e., the SOT layer 31 may be a mixture of both implementations.

In one embodiment illustrated in FIG. 5(a) describes the material combination comprises a metallic alloy 51 of the bismuth-based material and the metal. A concentration of the metal in the metallic alloy 51 may thereby be in a range of 5-50%.

In another embodiment illustrated in FIG. 5(b), the material combination comprises a multilayer structure 52 of one or more layers of the bismuth-based material and one or more layers of the metal. Each layer of the multilayer structure 52 may thereby have a thickness in a range of 0.2-2 nm (wherein thickness in this disclosure is defined in direction of the multiple layers arranged one after the other; i.e. the vertical direction of FIG. 5). In particular, each layer of the metal may have a thickness in a range of 0.1-0.7 nm, and/or each layer of the bismuth-based material may have a thickness in a range of 1.3-1.9 nm.

The SOT layer 31 could also be formed partly from a multilayer structure 52 as and partly from a metallic alloy 51. For example, a multilayer structure 52 could be arranged on a metallic alloy 51 or vice versa, or different regions of the SOT layer 31 could be implemented differently.

According to examples described this disclosure, the use of the material combination including the first material with large SOC (e.g., Bi and/or $Bi_2Se_3$) in an alloy 51 with a second metal material (e.g., Ni, and/or Zr, and/or Pt), which has a high melting point, may achieve a SOT layer 31 that has a sufficiently large SHA and also a high thermal and physical stability. In particular, the melting point of the SOT layer 31 may be well above 400° C. The same can also be achieved by using the multilayer structure 52 for providing the material combination for the SOT layer 31, i.e., different layers of the large SOC first material and the second metal material with the high melting point. An annealing sequence or process may be applied to the SOT layer 31 including the multilayer structure 52, which may provide a certain degree of diffusion, which may help to increase the melting temperature of the overall SOT layer 31.

Figure 6:
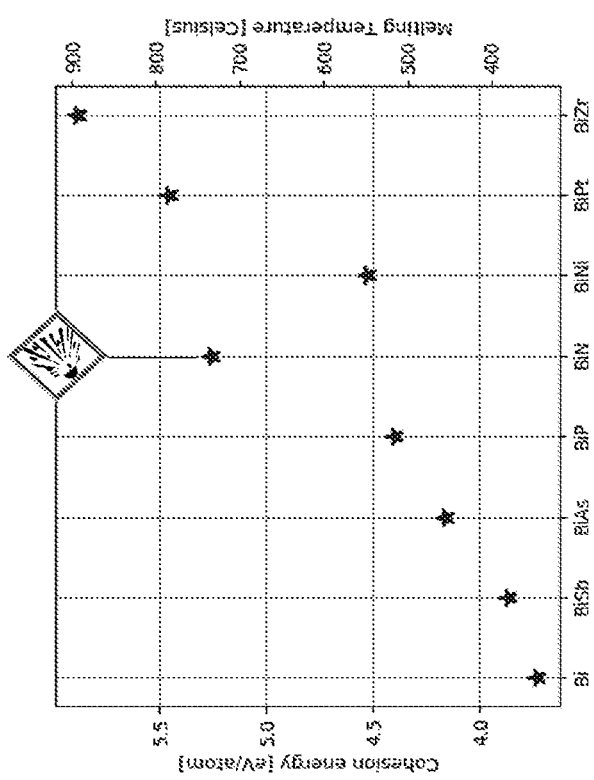
FIG. 6 illustrates calculations of the cohesion energy and the melting temperature, respectively, for different bismuth-based metallic alloys (at an exemplary 50% metal concentration).

FIG. 6 illustrates calculations of the cohesion energy (in eV/atom) and the melting temperature (in ° C.) of different bismuth-based alloys 51, wherein a 50% concentration of the metal and the bismuth-based material was respectively used. While pure Bi shows a very low melting temperature (of below 400° C.), an alloy of Bi with Ni, Pt or Zr respectively increases the melting point of the SOT layer 31 significantly (to between 500° and 900° C.). Notably, according to FIG. 6 it would also be possible to alloy Bi with N, in order to obtain a bismuth nitride (BiN) that shows an increased melting point. However, care has to be taken, as this alloy may be explosive.

It is possible that the SHA of the SOT layer 31 decreases with an increased concentration of the metal in the material combination, at least for very high metal concentrations. However, even lower metal concentrations of 5-50% may be sufficient to increase the melting temperature of the SOT layer 31 above 400° C., wherein these percentage values of the metal concentration are atomic percentages (at %).

Figure 7:
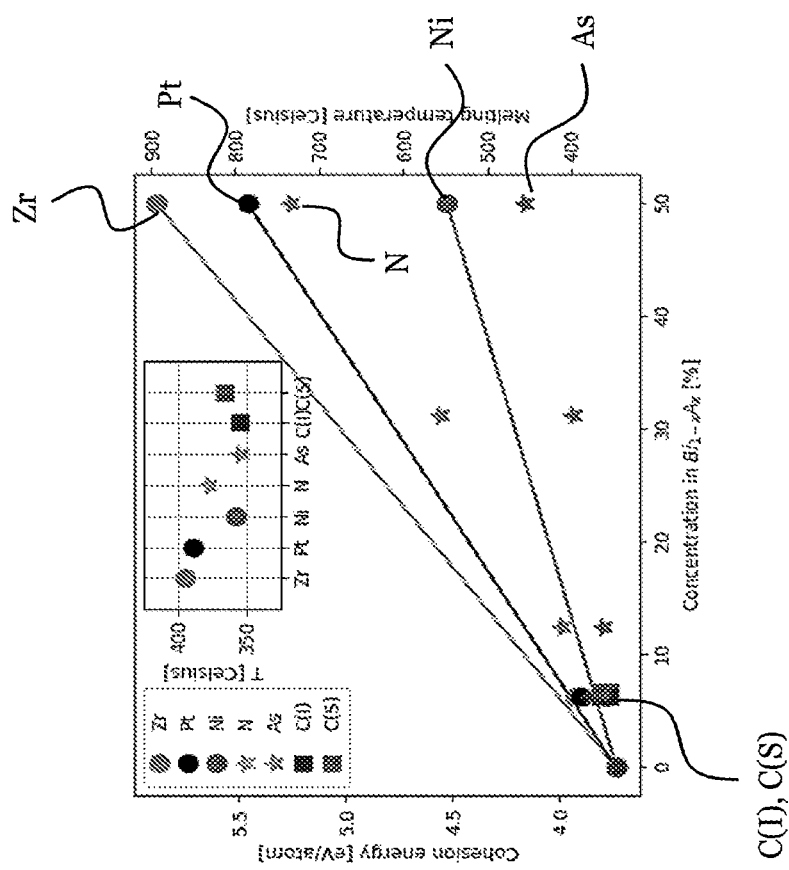
FIG. 7 illustrates calculations of the cohesion energy and the melting temperature, respectively, for different metal concentrations in some embodiments of bismuth-based metallic alloys.

For example, FIG. 7 illustrates calculations of the cohesion energies (in eV/atom) and the melting temperatures (in ° C.) as a function of the concentration of the metal for the different metallic alloys. The inset of FIG. 7 illustrates that BEOL compatibility can be reached for metal concentrations below 10%, for example, using Zr or Pt.

Figure 8:
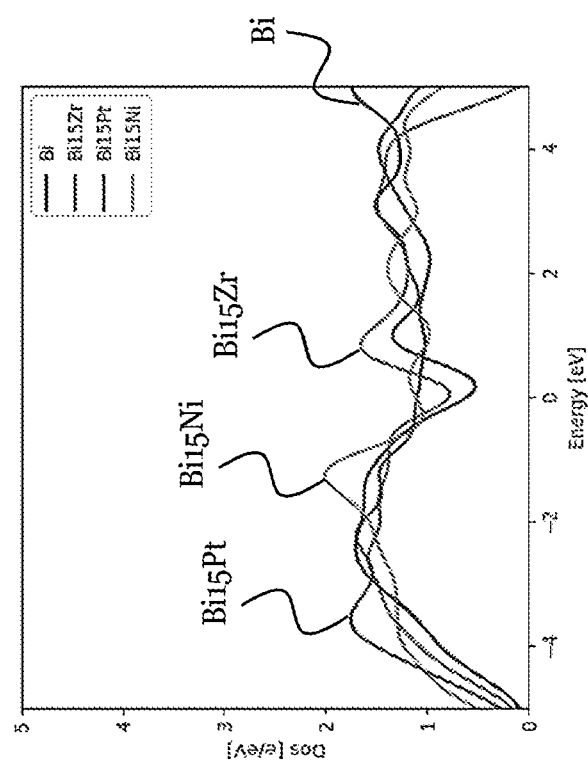
FIG. 8 illustrates calculations of the density of states of the bismuth-based alloys of FIG. 7, demonstrating that the alloy remains metallic.

Furthermore, a high electrical conductivity may also be an important parameter for a viable SOT-MRAM device. FIG. 8 illustrates the electronic density of states (DOS in e/eV) of different bismuth-based alloys, and demonstrates that these systems remain metallic after alloying. This means that the electrical conductivity of the SOT layer 31 remains sufficiently high.

Figure 9:
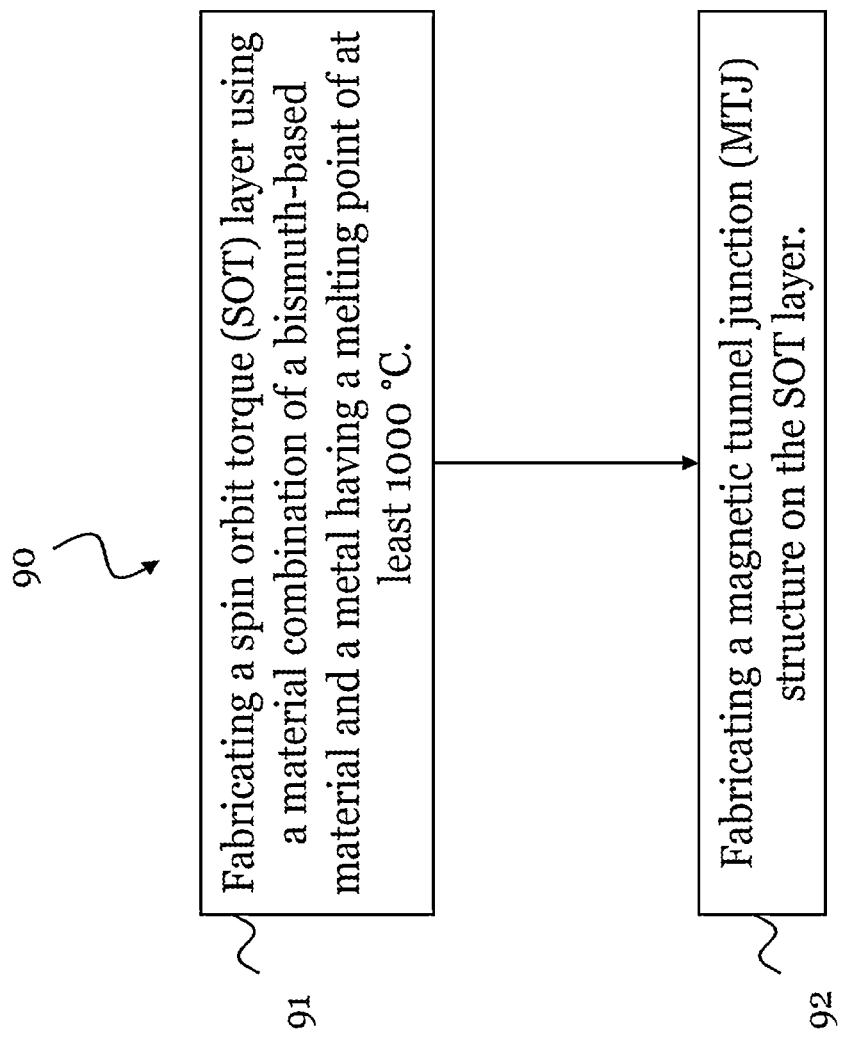
FIG. 9 illustrates a flowchart detailing a method for fabricating a magnetic structure for an SOT-MRANI device, according to an embodiment of this disclosure.

FIG. 9 illustrates a method 90 according to an embodiment of this disclosure. The method 90 is usable for manufacturing a magnetic structure 30 for a SOT-MRAM device, for instance, for fabricating the magnetic structure shown in FIG. 3 or in FIG. 4.

The method 90 comprises a step 91 of fabricating the SOT layer 31, e.g., any SOT layer 31 shown in FIG. 5. The SOT layer 31 comprises the material combination of the bismuth-based material and the metal having a melting point of at least 1000° C. Further, the method 90 comprises a step 92 of fabricating the MTJ structure 32 on the SOT layer 31.

If the material combination of the SOT layer 31 comprises the alloy 51 shown in FIG. 5(*a*), then the method 90 may comprise co-sputtering the bismuth-based material and the metal using two targets, or may comprise sputtering the bismuth-based material and the metal using a single target, in order to fabricate the SOT layer 31. If the material combination of the SOT layer 31 comprises the multilayer structure 52 shown in FIG. 5(*b*), then the method 90 may comprise depositing one or more layers of the bismuth-based material and depositing one or more layers of the metal above each other, in order to fabricate the SOT layer 31. For example, one layer of the bismuth-based material and one layer of the metal may be alternatingly deposited one or multiple times.

The embodiments provided and functionality realized in this disclosure are a SOT layer 31 with: (a) an excellent SOT performance, since the SOT layer 31 has a large SHA; and (b) thermal and physical stability, since the SOT layer 31 has a melting point of above 400° C., or above 500° C., or above 600° C., or above 700° C., or above 800° C., or about 900° C. This enables making a magnetic structure 30 for an SOT-MRAM device or VG SOT-MRAM device, which has efficient magnetization switching capabilities and is CMOS BEOL compatible.

In the above, the disclosed embodiments have mainly been described with reference to a limited number of examples. However, as is readily appreciated, other examples than the ones disclosed above are equally possible within the scope of the disclosure, as defined by the appended claims.

What is claimed is:

1. A magnetic structure for a spin orbit torque magnetic random access memory SOT-MRAM, device, the magnetic structure comprising:
   a SOT layer;
   a spacer layer carried by the SOT layer; and
   a magnetic tunnel junction, MTJ, structure arranged on the spacer layer carried by the SOT layer; wherein the SOT layer comprises:
      a material combination of a bismuth-based material and a metal having a melting point of at least 1000° C., and wherein material combination is a multilayer structure where each layer of the metal has a thickness in a range of 0.1-0.7 nm and each layer of the bismuth-based material has a thickness in a range of 1.3-1.9 nm.

2. The magnetic structure of claim 1, wherein the material combination comprises a metallic alloy of the bismuth-based material and the metal.

3. The magnetic structure of claim 2, wherein a concentration of the metal in the metallic alloy is in a range of 5-50%.

4. The magnetic structure of claim 1, wherein the material combination comprises a multilayer structure of one or more layers of the bismuth-based material and one or more layers of the metal.

5. The magnetic structure of claim 1, wherein the SOT layer has a thickness in a range of 2-20 nm.

6. The magnetic structure of claim 1, wherein the metal has a melting point of at least 1200° C., or of at least 1400° C., or of at least 1600° C.

7. The magnetic structure of claim 1, wherein the bismuth-based material comprises at least one of bismuth and bismuth antimonide.

8. The magnetic structure of claim 7, wherein a concentration of bismuth in the bismuth antimonide is in a range of 70%-90%.

9. The magnetic structure of claim 1, wherein the metal comprises at least one of nickel, platinum, and zirconium.

10. The magnetic structure of claim 1, wherein the MTJ structure comprises:
   a magnetic free layer arranged on the spacer layer that is arranged on the SOT layer;
   a tunnel barrier layer arranged on the magnetic free layer; and
   a magnetic reference layer or pinned layer arranged on the tunnel barrier layer.

11. A method for manufacturing a magnetic structure for a spin orbit torque magnetic random access memory, SOT-MRAM, device, the method comprising:
   fabricating a SOT layer;
   fabricating a spacer layer carried by the SOT layer; and
   fabricating a magnetic tunnel junction, MTJ, structure on the spacer layer carried by the SOT layer, wherein the SOT layer comprises a material combination of a bismuth-based material and a metal having a melting point of at least 1000° C., and wherein material combination is a multilayer structure where each layer of the metal has a thickness in a range of 0.1-0.7 nm and each layer of the bismuth-based material has a thickness in a range of 1.3-1.9 nm.

12. The method of claim 11, wherein the SOT layer is fabricated by co-sputtering the bismuth-based material and the metal using two targets or by sputtering the bismuth-based material and the metal using a single target.

13. The method of claim 11, wherein the SOT layer is fabricated by depositing one or more layers of the bismuth-based material and one or more layers of the metal above each other, for example, depositing alternatingly one layer of the bismuth-based material and one layer of the metal.

14. The method of claim 11, wherein the material combination comprises a metallic alloy of the bismuth-based material and the metal.

15. The method of claim 14, wherein a concentration of the metal in the metallic alloy is in a range of 5-50%.

16. The method of claim 11, wherein the material combination comprises a multilayer structure of one or more layers of the bismuth-based material and one or more layers of the metal.

* * * * *